(12) United States Patent
Sasaki et al.

(10) Patent No.: US 8,331,785 B2
(45) Date of Patent: Dec. 11, 2012

(54) ENCODING-DECODING METHOD, OPTICAL PULSE TIME SPREADING APPARATUS, OPTICAL ADD-DROP-MULTIPLEXER, AND OPTICAL COMMUNICATION SYSTEM

(75) Inventors: Kensuke Sasaki, Kanagawa (JP); Shuko Kobayashi, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 425 days.

(21) Appl. No.: 12/656,296

(22) Filed: Jan. 25, 2010

(65) Prior Publication Data

US 2010/0221010 A1    Sep. 2, 2010

(30) Foreign Application Priority Data

Feb. 27, 2009 (JP) ................................ 2009-045703

(51) Int. Cl.
*H04J 14/02* (2006.01)
*H04J 14/08* (2006.01)
(52) U.S. Cl. ................................ 398/75; 398/83; 398/87
(58) Field of Classification Search .............. 398/82–84, 398/75, 87
See application file for complete search history.

(56) References Cited

U.S. PATENT DOCUMENTS

| 5,982,791 | A  | * | 11/1999 | Sorin et al. ..................... 372/25 |
| 2004/0154337 | A1 | * | 8/2004  | Iwamura et al. ................. 65/425 |
| 2007/0286603 | A1 | * | 12/2007 | Minato ........................... 398/53 |
| 2009/0190927 | A1 | * | 7/2009  | Minato et al. ................... 398/77 |

OTHER PUBLICATIONS

Klaus Grobe et al., "PON Evolution from TDMA to WDM-PON", OFC NThD6 (2008).
Taro Hamanaka et al., "Demonstration of 16-user OCDMA over 3-wavelength WDM using 511-chip, 640 Gchip/s SSFBG en/decoder and single light source", OFC OMO1 (2007).

* cited by examiner

*Primary Examiner* — Leslie Pascal
(74) *Attorney, Agent, or Firm* — Rabin & Berdo, P.C.

(57) ABSTRACT

An optical pulse time spreading apparatus wherein an optical splitter divides an input optical pulse into first to U-th input optical pulses; first to U-th optical pulse time spreaders respectively have the first to U-th input optical pulses input thereto and output first to U-th chip pulse sequences each consisting of N chip pulses from a first to an N-th chip pulse arranged in order on a time axis into which the input optical pulse is time-spread; and an interval between adjacent ones of unit FBGs arranged in a p-th optical pulse time spreader and a Bragg reflection wavelength of the unit FBGs in the p-th optical pulse time spreader are set such that spectra of the first to U-th chip pulse sequences are different from each other.

7 Claims, 9 Drawing Sheets

ENCODING-DECODING METHOD, OPTICAL PULSE TIME SPREADING APPARATUS, OPTICAL ADD-DROP-MULTIPLEXER, AND OPTICAL COMMUNICATION SYSTEM

BACKGROUND OF THE INVENTION

1. Field of the Invention

The present invention relates to an encoding-decoding method for optical pulses, an optical pulse time spreading apparatus used in optical multiplexing transmission, an optical add-drop-multiplexer (ADM) using the optical pulse time spreading apparatus, and an optical communication system using the ADM.

2. Description of the Related Art

In these years, there is a rapidly increasing demand for communications due to the widespread use of the Internet, and accordingly communication capacity is being rapidly increased. Also, communication systems in a wide variety of forms are being constructed, and communication networks equipped with an ADM capable of large-capacity transmission and in a flexible bus or ring form are being actively proposed and researched.

Attracting attention as a technique for increasing communication capacity are optical multiplexing technologies that transmit optical pulse signals for multiple channels together over a single optical fiber transmission line. Among the optical multiplexing technologies, an optical time division multiplexing (OTDM) scheme, a wavelength division multiplexing (WDM) scheme, and an optical code division multiplexing (OCDM) scheme are being actively researched.

Because any of these optical multiplexing technologies can transmit optical pulse signals for multiple channels together over a single optical fiber transmission line, with existing communication networks remaining as they are, a great increase in communication capacity can be provided. Further, by combining these optical multiplexing technologies, a further great increase in communication capacity can be realized. For example, a combined multiplexing transmission system of the OCDM scheme and the TDM scheme is being studied. Refer to, for example, Klaus Grobe, Jorg-Peler Elbers, "PON Evolution from TDMA to WDM-PON", OFC NThD6 (2008) (hereinafter, referred to as Non-patent document 1). Or, a combined multiplexing transmission system of the OCDM scheme and the WDM scheme is being studied. Refer to, for example, Taro Hamanaka, Xu Wang, Naoya Wada, and Ken-ich Kitayama, "Demonstration of 16-user OCDMA over 3-wavelength WDM using 511-chip, 640 Gchip/s SSFBG en/decoder and single light source", OFC OMO1 (2007) (hereinafter, referred to as Non-patent document 2).

SUMMARY OF THE INVENTION

A first problem to solve, for a multiplexing transmission system of the WDM scheme, is that a wavelength grid interval needs to be narrowed according to an increase in the number of channels that are multiplexed. When the wavelength grid interval is narrowed, the absolute value of the drift of a light source to generate an optical carrier wave needs to be made small enough to fall within the range of the wavelength grid interval. The drift of the light source occurs in association with variation in ambient temperature over time or the like. If the width of variation in the absolute value of the drift of the light source exceeds the range of the wavelength grid interval, the ability to recognize channels is lost of the multiplexing transmission system of the WDM scheme.

In connection with this, the WDM grid is specified as 100 GHz (about 0.8 nm interval), 50 GHz (about 0.4 nm interval), etc., in an ITU international standard determined by the International Telecommunication Union (ITU) of the United Nations.

A second problem to solve, for the multiplexing transmission system of the WDM scheme, is that the system needs a light source to generate optical carrier waves of multiple wavelengths. Multi-wavelength light sources are expensive, and in addition there is a limitation on the wavelength resource that can be used for the multiplexing transmission system. Further, it may be possible but requires an advanced technology to secure the long-time stability of wavelengths of a multi-wavelength light source and takes high production costs.

The inventor of the present invention found that even for an optical pulse whose wavelength spectrum has only one maximum, as long as the wavelength spectrum has a finite width, the wavelength spectrum can be divided into multiple components to assign a channel to each of the divided wavelength spectrum components. Further, the inventor found that it is possible to implement, based on this concept, quasi-WDM wherein the ability to recognize channels based on the differences between the wavelength spectrum components will not be affected even if the wavelength of a single-wavelength optical carrier wave generating light source which generates optical pulses whose wavelength spectrum has only one maximum varies in association with variation in ambient temperature or the like.

That is, by dividing the wavelength spectrum of the single-wavelength optical carrier wave generating light source into multiple components on a per wavelength basis by a super-structured fiber Bragg grating (SSFBG) to realize a quasi-WDM scheme, fluctuation in the wavelength of the single-wavelength optical carrier wave generating light source does not affect the wavelengths of the divided wavelength spectra. This is because even if fluctuation in the wavelength of the single-wavelength optical carrier wave generating light source occurs, the values of the wavelengths divided by the SSFBG do not vary. Thus, with this quasi-WDM scheme, channel recognition can be performed without being affected by fluctuation in the wavelength of the single-wavelength optical carrier wave generating light source, the above two problems will be solved.

The inventor of the present invention ascertained that the use of the optical pulse time spread effect provided by the SSFBG makes it possible to realize a quasi-WDM scheme which divides the wavelength spectrum of an optical pulse having only one maximum into multiple components and assigns a channel to each of the divided wavelength spectrum components.

Thus, an object of the present invention is to provide an encoding-decoding method for optical pulses that is capable of using single-wavelength optical pulses and can provide a transmission system of a quasi-WDM scheme which is not affected by the variation if the wavelength of single-wavelength optical pulses varies in association with variation in ambient temperature or the like. Another object of the present invention is to provide an optical pulse time-spreading apparatus which can be used as an encoder and a decoder to implement this method. Yet another object is to provide an ADM configured with this optical pulse time-spreading apparatus and an optical communication system using the ADM.

Here, the terms "single-wavelength optical pulse" and "quasi-WDM" are defined as follows. That is, the single-wavelength optical pulse refers to an optical pulse whose wavelength spectrum has only one maximum. The quasi- WDM refers to a scheme which divides the wavelength spectrum of a single-wavelength optical pulse into components, assigns them to the respective channels, and, in combination with the OCDM scheme, to perform channel recognition based on differences between the components of the wavelength spectrum and differences in code described later.

In the usual WDM, an optical pulse whose wavelength spectrum has a plurality of maximums is distributed to the channels such that an intensity maximum wavelength corresponds to each channel, and by recognizing these wavelengths, the recognition of the channels is achieved. That is, whereas the wavelength spectrum of the optical carrier wave of a wavelength multiplexed signal in the usual WDM has a plurality of maximums, the wavelength spectrum of the optical carrier wave of a signal in the quasi-WDM scheme of the present invention has a single maximum.

In the description below, the terms encode and decode will be used in broader meanings than in the conventional ones. That is, a rule to spread optical pulses forming an optical pulse signal on a time axis is not limited to a code in a usual sense (i.e., code in a narrow sense), but the terms encoding and decoding will be also used for any rule which is uniquely determined (i.e., code in a broad sense). Thus, the terms encoded optical pulse signal, chip pulse, etc. will be used for the code in a broad sense.

Further, a sequence of chip pulses output from an SSFBG comprising the optical pulse time-spreading apparatus of the present invention described below is not one generated by time-spreading an optical pulse based on a code in a strict sense like a sequence of chip pulses output from an SSFBG having set therein a usual code. However, hereinafter for convenience of description, transforming an optical pulse into a sequence of chip pulses is also referred to as encoding, and producing an auto-correlation wave or a cross-correlation wave from a sequence of chip pulses is also referred to as decoding.

Accordingly, according to the summary of the present invention, an encoding-decoding method for optical pulses which has the configuration described below is provided.

An encoding-decoding method for optical pulses of the present invention comprises an encoding step, a multiplexing step, and a decoding step.

The encoding step is a step of time-spreading and spectrum-dividing an input optical pulse to generate first to U-th chip pulse sequences having spectra different from each other and each consisting of N chip pulses from a first to an N-th chip pulse, where N is an integer of two or greater and U is an integer of one or greater satisfying that U≦N.

The multiplexing step is a step of multiplexing the first to U-th chip pulse sequences on a time axis to generate a multiplexed chip pulse sequence.

The decoding step is a step of time-spreading and spectrum-dividing each of chip pulses forming the multiplexed chip pulse sequence to generate a chip pulse sequence and taking an auto-correlation wave of one chip pulse sequence of the first to U-th chip pulse sequences, which wave is produced by interference between the generated chip pulse sequences, as a reproduced optical pulse for the input optical pulse.

Further, according to the summary of the present invention, an optical pulse time spreading apparatus which has the configuration described below is provided.

According to the present invention, there is provided an optical pulse time spreading apparatus which comprises first to U-th optical pulse time spreading units (or spreaders) each outputting a chip pulse sequence consisting of N chip pulses from a first to an N-th chip pulse arranged in order on a time axis by time-spreading an input optical pulse, where N is an integer of two or greater and U is an integer of one or greater satisfying that U≦N.

Each of the first to U-th optical pulse time spreading units comprises a superstructured fiber Bragg grating (SSFBG) comprising N unit fiber Bragg gratings (FBGs), and an interval between adjacent ones of the unit FBGs arranged in a p-th optical pulse time spreading unit, where p refers to all integers of from 1 to U, and a Bragg reflection wavelength of the unit FBGs in the p-th optical pulse time spreading unit are set such that spectra of first to U-th chip pulse sequences respectively output from the first to U-th optical pulse time spreading units are different from each other.

In an optical pulse time spreading apparatus according to the present invention, preferably, an interval between adjacent ones of the unit FBGs arranged in a p-th optical pulse time spreading unit and a Bragg reflection wavelength of the unit FBGs in the p-th optical pulse time spreading unit are set such that spectra of first to U-th chip pulse sequences respectively output from the first to U-th optical pulse time spreading units are different from each other and that energies of the chip pulse sequences are even.

Further, preferably in an optical pulse time spreading apparatus according to the present invention, the interval between adjacent ones of the unit FBGs arranged in the p-th optical pulse time spreading unit and the Bragg reflection wavelength of the unit FBGs in the p-th optical pulse time spreading unit are specified as follows.

The Bragg reflection wavelength $\lambda_{Bp}$ of the unit FBGs included in the p-th optical pulse time spreading unit is given by the following equations (1a) and (1b):

$$\lambda_{Bp} = \lambda_s + k(\Delta\lambda_s/U) \tag{1a}$$

for when U is an odd number, where k is an integer satisfying that $|k| < U/2$, $$\lambda_{Bp} = \lambda_s + (2k+1)(\Delta\lambda_s/2U) \tag{1b}$$

for when U is an even number, where k is an integer satisfying that $|2k+1|/2 < U/2$.

A Bragg frequency $\nu_{Bp}$ corresponding to the Bragg reflection wavelength $\lambda_{Bp}$ of the unit FBGs included in the p-th optical pulse time spreading unit is set to be within a range to satisfy an inequality given by the following equation (2):

$$(\nu_s - \Delta\nu_s/2) < \nu_{Bp} < (\nu_s + \Delta\nu_s/2) \tag{2}$$

Further, an interval $\Delta\nu_{Bp}$ between main peaks in the frequency spectrum of the chip pulse sequence output from the p-th optical pulse time spreading unit is set to be within a range to satisfy an inequality given by the following equation (3):

$$0 < \Delta\nu_{Bp} < \Delta\nu_s \tag{3}$$

and a phase difference $\Phi$ between chip pulses reflected from adjacent unit FBGs of the p-th optical pulse time spreading unit is given by the following equation (4):

$$\Phi = (2m+1)(\lambda_{Bp}/2) \tag{4}$$

Here, $\lambda_s$ is a peak wavelength of the wavelength spectrum of the input optical pulse, $\Delta\lambda_s$ is the full width at half maximum of the wavelength spectrum of the input optical pulse, $\nu_s$ is a peak frequency of the frequency spectrum of the input optical pulse, $\Delta\nu_s$ is the full width at half maximum of the frequency spectrum of the input optical pulse, and "m" is an integer of zero or greater.

Further, according to the summary of the present invention, an add-drop-multiplexer (ADM) that has the configuration described below is provided.

An ADM of the present invention is an ADM which has a function of extracting an optical pulse signal having a specific wavelength component propagating through an optical fiber transmission line and sending out a new optical pulse signal having the specific wavelength onto the optical fiber transmission line. A splitting unit (or splitter) of the ADM that has a function of extracting the optical pulse signal from the optical fiber transmission line or an inserting unit of the ADM that has a function of inserting the new optical pulse signal into the optical fiber transmission line is provided with an optical pulse time spreading apparatus of the present invention described above.

An ADM of the present invention preferably comprises a first optical circulator comprising first to third ports, a second optical circulator comprising first to third ports, a first optical pulse time spreading apparatus, a second optical pulse time spreading apparatus, and an optical isolator. The first and second optical pulse time spreading apparatuses are each an optical pulse time spreading apparatus of the present invention described above.

The ADM operates as follows. An optical signal output from the second port of the first optical circulator is input to the first optical pulse time spreading apparatus; an optical signal output from the first optical pulse time spreading apparatus is input to the optical isolator; an optical signal output from the optical isolator is input to the second optical pulse time spreading apparatus; an optical signal output from the second optical pulse time spreading apparatus is input to the second port of the second optical circulator; an input optical signal supplied from outside the ADM is input via the first port of the first optical circulator; a split signal split and extracted by the ADM is output from the third port of the first optical circulator; an insertion optical signal that is output outside the ADM via the ADM is input to the first port of the second optical circulator; and an output optical signal that is output from the ADM to the outside is output from the third port of the second optical circulator.

Further, according to the summary of the present invention, an optical communication system that has the configuration described below is provided.

According to the present invention, there is provided an optical communication system which includes a plurality of subscriber networks. Each of the subscriber networks is assigned a specific ADM and is connected via the ADM to an optical fiber network forming the optical communication system, and the ADM of the present invention described above is utilized as these ADMs.

An optical communication system of the present invention is preferably configured as follows. A code that is a rule to generate the sequence of the first to N-th chip pulses from the input optical pulse and restore the input optical pulse from the sequence of the first to N-th chip pulses is assigned to the first and second optical pulse time spreading apparatuses of the specific ADM. And in each of the first and second optical pulse time spreading apparatuses forming the specific ADM, only an optical pulse time spreading unit having the assigned code set therein from among the first to U-th optical pulse time spreading units is set to be operable.

According to the encoding-decoding method for optical pulses of the present invention, in the encoding step, an input optical pulse is time-spread and spectrum-divided to generate first to U-th chip pulse sequences having spectra different from each other. In the decoding step, an auto-correlation wave of one chip pulse sequence of the first to U-th chip pulse sequences is produced as a reproduced optical pulse for the input optical pulse.

An optical pulse of a single wavelength used as the input optical pulse has only one maximum in its spectrum and has a spectrum width of a finite value. Thus, in the encoding step, by dividing the spectrum band of the input optical pulse, the first to U-th chip pulse sequences having the divided spectrum components respectively allocated thereto can be generated. As such, the spectrum components distributed to the first to U-th chip pulse sequences are different from each other, thus producing the same effect as by assigning different wavelengths to the first to U-th chip pulse sequences respectively. That is, a quasi-WDM can be implemented.

Moreover, assigning spectrum components of the input optical pulse to the first to U-th chip pulse sequences respectively is implemented by using SSFBGs as described above. That is, the assignment of spectrum components to the first to U-th chip pulse sequences is determined by the configurations of the SSFBGs. The spectra assigned to the first to U-th chip pulse sequences will not be affected by a variation in the center wavelength of the input optical pulse, if the input optical pulse does not vary in center wavelength so much as not to include the spectrum components assigned to the first to U-th chip pulse sequences, which assignment is determined by the configurations of the SSFBGs.

Further, in the encoding step and the multiplexing step, the first to U-th chip pulse sequences having spectra different from each other are generated and multiplexed to generate a multiplexed chip pulse sequence. In the encoding step and the multiplexing step, wavelength multiplexing of a quasi-WDM scheme is performed. In the decoding step, an auto-correlation wave of one chip pulse sequence of the first to U-th chip pulse sequences is generated. In the decoding step, wavelength demultiplexing of a quasi-WDM scheme is performed. That is, it can be perceived that quasi-WDM and code division multiplexing are simultaneously performed in which the first to U-th channels are assigned to the first to U-th chip pulse sequences respectively.

Thus, according to the encoding-decoding method for optical pulses of the present invention, single-wavelength optical pulses can be used, and an optical multiplexing transmission scheme can be realized which is not affected by variation of the wavelength of single-wavelength optical pulses in association with the ambient temperature or the like.

According to the optical pulse time spreading apparatus of the present invention, the encoding step to generate the first to U-th chip pulse sequences is implemented by the first to U-th optical pulse time spreading units. Also, the first to U-th optical pulse time spreading units implement the decoding step of time-spreading and spectrum-dividing each of chip pulses forming the multiplexed chip pulse sequence of the first to U-th chip pulse sequences to generate a chip pulse sequence and producing an auto-correlation wave of one chip pulse sequence of the first to U-th chip pulse sequences as a reproduced optical pulse for the input optical pulse, which wave is produced by interference between the generated chip pulse sequences. The auto-correlation wave is produced from the multiplexed chip pulse sequence when decoded by an optical pulse time spreading unit having the same configuration as one of the first to U-th optical pulse time spreading units that was used in encoding the input optical pulse. That is, when a p-th chip pulse sequence encoded by a p-th optical pulse time spreading unit is decoded by a q-th optical pulse time spreading unit, where q is an integer of from 1 to U, it is only when p=q that an auto-correlation wave is produced.

Thus, with the optical pulse time spreading apparatus of the present invention, the encoding step and the decoding step of the encoding-decoding method for optical pulses of the present invention can be realized.

According to the ADM of the present invention, the splitter of the ADM that has a function of extracting an optical pulse signal from the optical fiber transmission line or the inserting unit of the ADM that has a function of inserting a new optical pulse signal into the optical fiber transmission line is provided with an optical pulse time spreading apparatus of the present invention described above. Because the optical pulse time spreading apparatus of the present invention implements wavelength multiplexing-demultiplexing of a quasi-WDM scheme, an ADM having a function equivalent to the conventional WDM scheme and OCDM scheme in combination is implemented.

According to the optical communication system of the present invention, each of the subscriber networks is assigned the ADM of the present invention as a specific ADM and is connected via the ADM to an optical fiber network forming part of the optical communication system. Thus, the encoding step and the decoding step of the encoding-decoding method for optical pulses of the present invention can be implemented as described above, and hence an optical communication system having a capability equivalent to the conventional WDM scheme and OCDM scheme in combination is implemented.

BRIEF DESCRIPTION OF THE DRAWINGS

FIG. 5A is a diagram schematically showing the way that the unit FBGs are arranged at intervals L in an optical fiber, and FIG. 5B is a diagram schematically showing the refractive index structure of the SSFBG;

FIG. 6A illustrates the apodization, and FIG. 6B shows the way that the magnitudes of the refractive index modulation change along the longitudinal direction of the optical fiber;

FIG. 7A shows the reflection wavelength spectrum of the optical pulse time spreading unit when apodization for the unit FBG is not performed; and FIG. 7B shows the reflection wavelength spectrum of the optical pulse time spreading unit when apodization for the unit FBG is performed;

FIG. 8A shows the reflection wavelength spectrum of the optical pulse time spreading unit when apodization is not performed, and FIG. 8B shows the reflection wavelength spectrum of the optical pulse time spreading unit when apodization is performed;

FIG. 9A shows the way that an optical pulse is transformed and encoded into a chip pulse sequence by any one of the optical pulse time spreading units forming the optical pulse time spreading apparatus according to the embodiment of the present invention, FIG. 9B shows the way of decoding by any one of the optical pulse time spreading units included in an optical pulse time spreading apparatus having the same configuration as the optical pulse time spreading apparatus that encoded, and FIG. 9C is illustrating of the process where each of M chip pulses forming a chip pulse sequence input to a decoder is transformed by the decoder into M chip pulses and where their interference generates an auto-correlation wave or a cross-correlation wave;

FIG. 10A is illustrating the splitting of a signal, and FIG. 10B is illustrating the insertion of a signal.

DETAILED DESCRIPTION OF THE INVENTION

Embodiments of the present invention will be described below with reference to the drawings. Note that the drawings are only illustrative of exemplary configurations according to the embodiments of the present invention and are not to be construed as limiting the present invention.

<Optical Pulse Time Spreading Apparatus>

Figure 1:
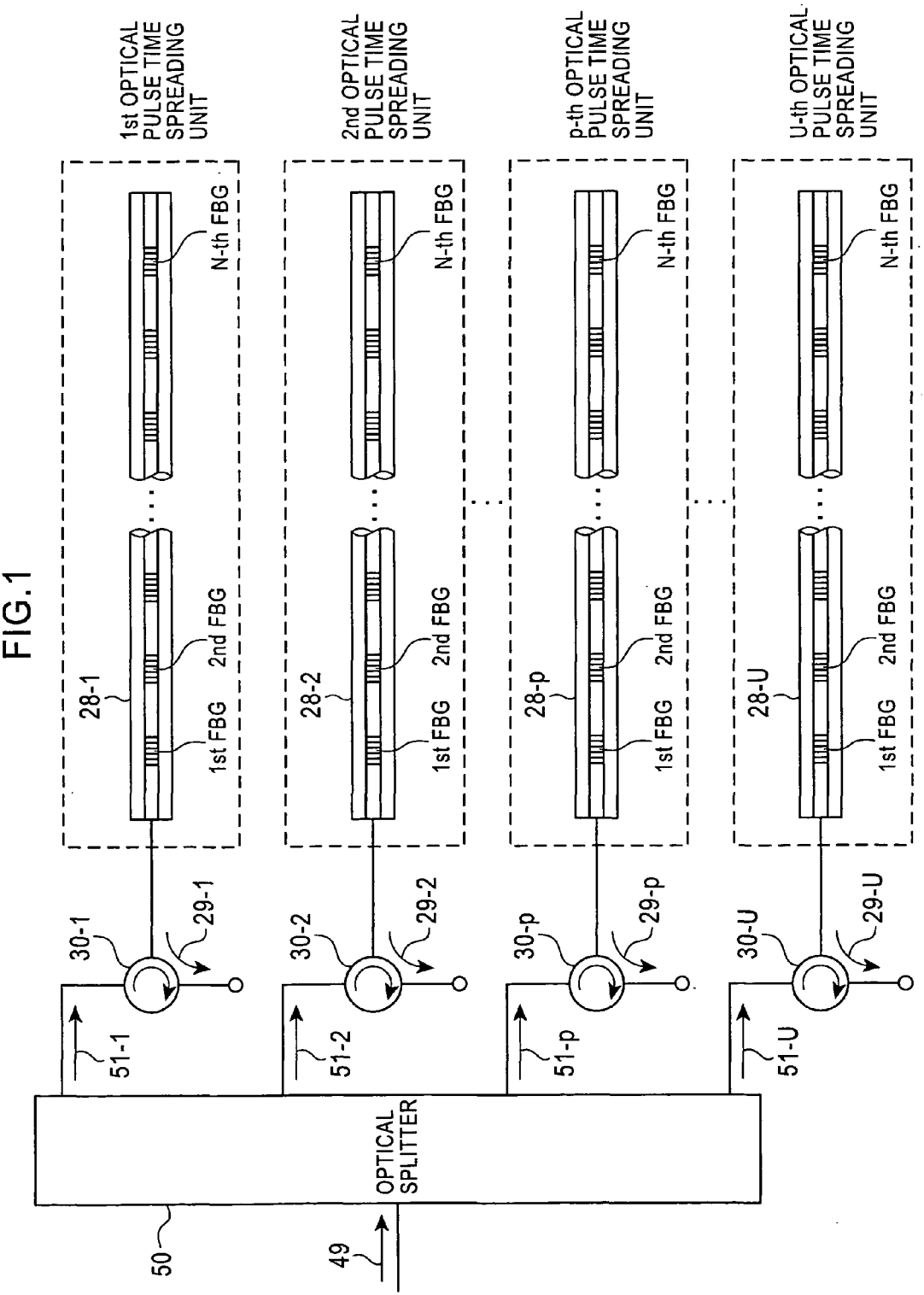
FIG. 1 is a schematic configuration diagram of an optical pulse time spreading apparatus according to an embodiment of the present invention.

The configuration and operation of an optical pulse time spreading apparatus according to an embodiment of the present invention will be described. FIG. 1 is a schematic configuration diagram of the optical pulse time spreading apparatus according to the embodiment of the present invention.

The optical pulse time spreading apparatus according to the embodiment of the present invention comprises an optical splitting unit (or optical splitter) 50 to split an input optical pulse 49 into U portions to output first to U-th input optical pulses 51-1 to 51-U. The first to U-th input optical pulses 51-1 to 51-U are respectively input to first to U-th optical circulators 30-1 to 30-U provided at the stage preceding first to U-th optical pulse time spreading units 28-1 to 28-U. The first to U-th input optical pulses 51-1 to 51-U are respectively input to the first to U-th optical pulse time spreading units 28-1 to 28-U via the first to U-th optical circulators 30-1 to 30-U.

The first to U-th optical pulse time spreading units 28-1 to 28-U respectively have the first to U-th input optical pulses 51-1 to 51-U input thereto to output first to U-th chip pulse sequences 29-1 to 29-U each consisting of N chip pulses from a first to an N-th chip pulse arranged in order on a time axis by time-spreading.

The first to U-th optical pulse time spreading units 28-1 to 28-U each comprise an SSFBG comprising N unit FBGs from a first FBG to an N-th FBG. The interval between adjacent ones of the unit FBGs arranged in a p-th optical pulse time spreading unit 28-p and the Bragg reflection wavelength of the unit FBGs in the p-th optical pulse time spreading unit are set such that the spectra of the first to U-th chip pulse sequences 29-1 to 29-U respectively output from the first to U-th optical pulse time spreading units 28-1 to 28-U are different from each other.

In the optical pulse time spreading apparatus according to the embodiment of the present invention, the interval between adjacent ones of the unit FBGs and the Bragg reflection wavelength of the unit FBGs in the p-th optical pulse time spreading unit are set such that the spectra of the first to U-th chip pulse sequences 29-1 to 29-U respectively output from the first to U-th optical pulse time spreading units 28-1 to 28-U are different from each other and that the energies of the chip pulse sequences are even.

In order to set the interval between adjacent ones of the unit FBGs and the Bragg reflection wavelength of the unit FBGs such that the spectra of the first to U-th chip pulse sequences 29-1 to 29-U are different from each other and that the energies of the chip pulse sequences are even, the respective values of the Bragg reflection wavelength $\lambda_{Bp}$ of the unit FBGs included in the p-th optical pulse time spreading unit, the Bragg frequency $\nu_{Bp}$ corresponding to the Bragg reflection wavelength $\lambda_{Bp}$ of the unit FBGs included in the p-th optical pulse time spreading unit, the interval $\Delta\nu_{Bp}$ between main peaks in the frequency spectrum of the chip pulse sequence output from the p-th optical pulse time spreading unit, and the phase difference $\Phi$ between chip pulses reflected from adjacent unit FBGs of the p-th optical pulse time spreading unit need to be set so as to satisfy the above-described equations (1a), (1b) to (4).

When actually producing the optical pulse time spreading apparatus according to the embodiment of the present invention, by using numerical simulation or the like, the respective values of $\lambda_{Bp}$, $\nu_{Bp}$, $\Delta\nu_{Bp}$, and $\Phi$ should be set to be within ranges to satisfy the above equations (1a), (1b) to (4) while ascertaining characteristics such as the wavelength spectra of the first to U-th chip pulse sequences respectively output from the first to U-th optical pulse time spreading units.

Figure 2:
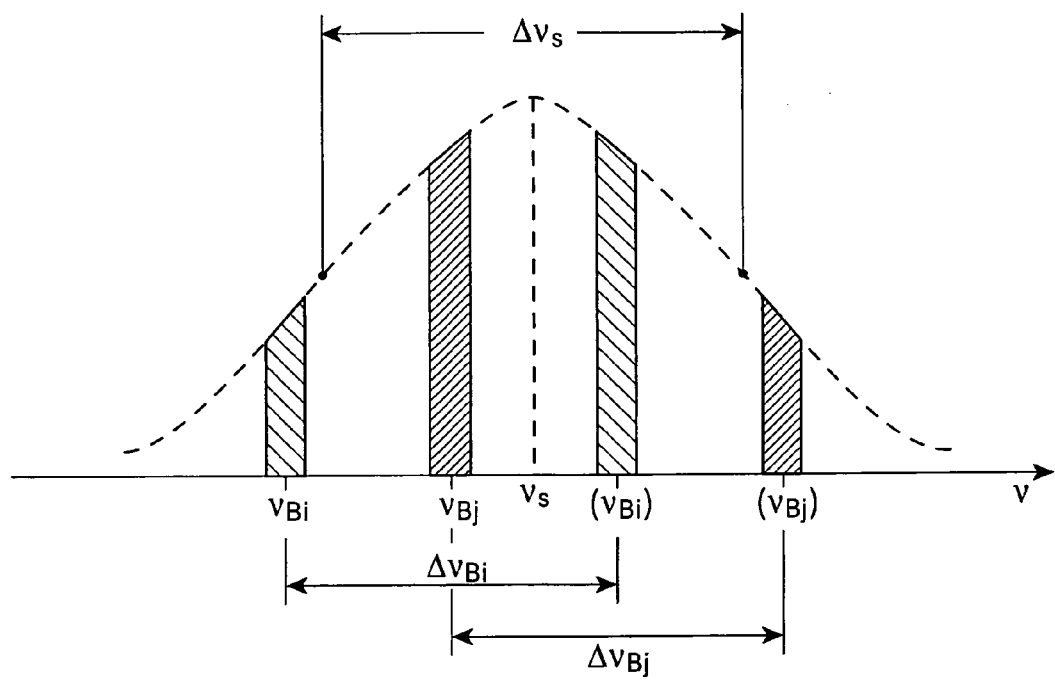
FIG. 2 is a schematic diagram illustrating a quasi-WDM scheme.

The quasi-WDM scheme, which divides the spectrum of an input optical pulse having only one maximum into multiple components, assigns channels to the divided spectrum components respectively, will be described with reference to FIG. 2. FIG. 2 is a schematic diagram illustrating the quasi-WDM scheme; frequencies of the input optical pulse are plotted on the horizontal axis on an arbitrary scale; and the magnitude of light intensity is shown along the vertical axis direction on an arbitrary scale with the vertical axis being omitted.

In FIG. 2, the bell-shaped curve indicated by a broken line represents the frequency spectrum of the input optical pulse, and its full width at half maximum is $\Delta\nu_s$. When an optical pulse having such a frequency spectrum is incident on the SSFBG, the reflection frequency bands determined by the Bragg wavelength $\lambda_B$ of the unit FBGs forming the SSFBG and the arrangement interval L of the unit FBGs are determined. In FIG. 2, the Bragg reflection spectrum by the SSFBG constituting the i-th optical pulse time spreading unit and the Bragg reflection spectrum by the SSFBG constituting the j-th optical pulse time spreading unit are indicated by different hatchings respectively, where i and j are integers satisfying that $1\leq i \leq U$ and $1\leq j \leq U$.

The Bragg reflection wavelength $\lambda_{Bp}$ of the unit FBGs forming the SSFBG and the arrangement interval L of the unit FBGs can be set such that a plurality of the reflection frequency bands of the SSFBG exist in the range of the frequency spectrum of the input optical pulse. In FIG. 2, two reflection frequency bands exist for each of the SSFBGs constituting the i-th and j-th optical pulse time spreading units. The band width of each of the two reflection frequency bands of the SSFBG is determined to be at a value proportional to the inverse of the time waveform of a chip pulse reflected from a unit FBG, and each of the intervals $\Delta\nu_{Bi}$ and $\Delta\nu_{Bj}$ between the two reflection frequency bands is determined by the arrangement interval L of the unit FBGs.

By setting them such that a plurality of the reflection frequency bands of the SSFBG exist in the range of the frequency spectrum of the input optical pulse, the energies of the first to U-th chip pulse sequences respectively output from the first to U-th optical pulse time spreading units can be set to be even.

Relationships between the reflection wavelength spectra of two types of optical pulse time spreading units different in the Bragg reflection wavelength $\lambda_B$ of the unit FBGs and the wavelength spectrum of an input optical pulse will be described with reference to FIGS. 3A and 3B. Here the full width at half maximum of the input optical pulse on the time axis is 6 ps, and the number of channels is 16.

Figure 3A:
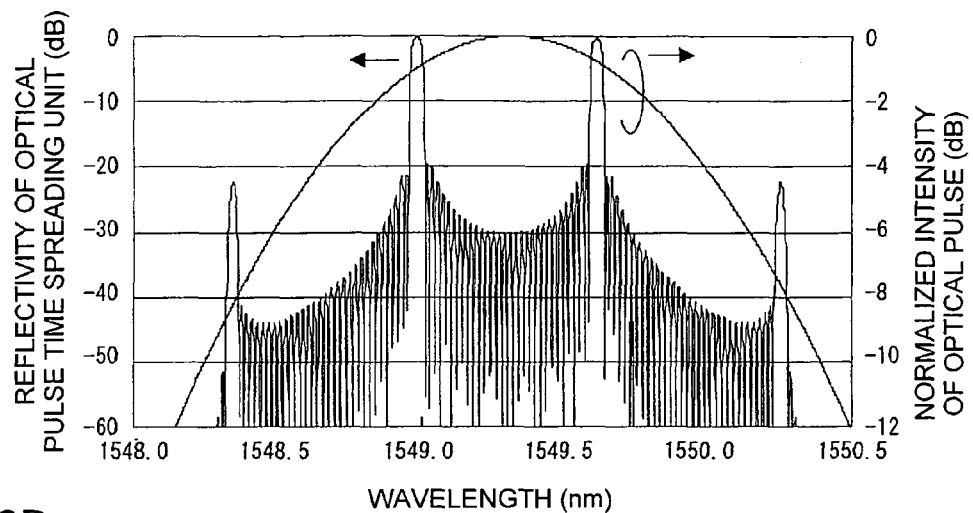
FIGS. 3A and 3B are diagrams illustrating relationships between the reflection wavelength spectra of two types of optical pulse time spreading units different in the Bragg reflection wavelength of unit FBGs and the wavelength spectrum of an input optical pulse.
Figure 3B:
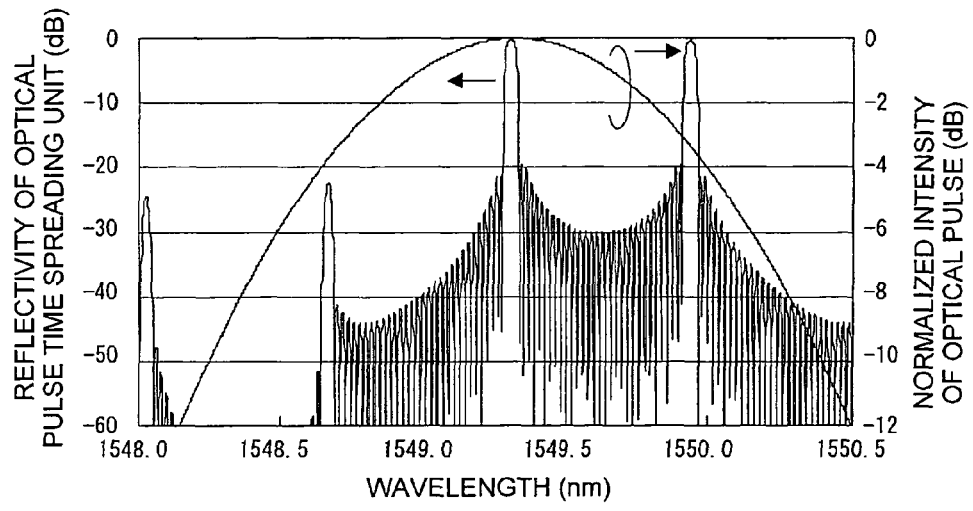

FIGS. 3A and 3B are illustrating relationships between the reflection wavelength spectra of two types of optical pulse time spreading units different in the Bragg reflection wavelength $\lambda_B$ of the unit FBGs and the wavelength spectrum of an input optical pulse. The Bragg reflection wavelength $\lambda_B$ of the unit FBGs is set at a different value for each of FIGS. 3A and 3B. In FIGS. 3A and 3B, the wavelength is plotted in units of nm on the horizontal axis, and the Bragg reflectivity of the optical pulse time spreading unit is plotted in units of dB on the left vertical axis, and the normalized intensity of the optical pulse that is an incident optical pulse is plotted in units of dB on the right vertical axis.

The wavelength spectrum of output light (corresponding to one of the first to U-th chip pulse sequences) Bragg-reflected (i.e., reflected by Bragg reflection) and output from the optical pulse time spreading unit consists of the wavelength components in the overlap areas of the input optical pulse and the reflection wavelength spectrum (reflectivity plotted on the left vertical axis) of the optical pulse time spreading unit. It can be seen that by changing the set value of the Bragg reflection wavelength $\lambda_B$ of the unit FBGs, the wavelength spectrum bands assigned to each optical pulse time spreading unit can be changed and that thereby a quasi-WDM can be realized.

The code imparted to each of the encoded chip pulse sequences output from the first to 16th optical pulse time spreading units is given by the value of the Bragg reflection wavelength $\lambda_B$ of the unit FBGs, and this value of the wavelength can be easily adjusted by a dynamic method such as extending the SSFBG or a thermal method such as controlling temperature. The value of the Bragg reflection wavelength $\lambda_B$ can be adjusted with accuracy of 1 pm (picometer) by these methods.

By narrowing the full width at half maximum of the time waveform of the input optical pulse, the frequency spectrum width of the input optical pulse can be broadened. By this means, enough frequency spectrum band width to be distributed to the first to 16th chip pulse sequences can be ensured. Further, even if the center wavelength of the light source outputting input optical pulses varies, the frequency spectrum of the chip pulse sequence output from each of the first to 16th optical pulse time spreading units does not vary because the frequency spectrum of the chip pulse sequence is determined by the refractive index periodical structure of the SSFBG constituting the optical pulse time spreading unit. In connection with this, whereas the temperature dependency of the oscillation wavelength of a semiconductor laser used as the input optical pulse source is as large as 0.8 nm/° C., the temperature dependency of the wavelength spectrum of the chip pulse sequence determined by the refractive index periodical structure of the SSFBG is 0.01 nm/° C., about two orders of magnitude smaller than that.

Figure 4:
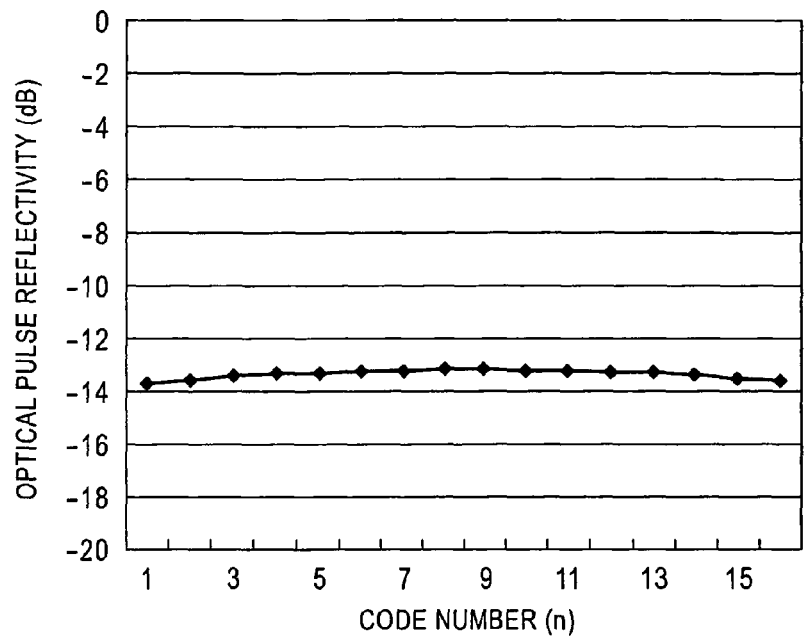
FIG. 4 illustrates that by appropriately setting the full width at half maximum of the input optical pulse, the Bragg reflection wavelength of the unit FBGs, and the arrangement interval L of the unit FBGs, the output light intensities of first to 16th optical pulse time spreading units can be made even.

It will be described with reference to FIG. 4 that by appropriately setting the full width at half maximum of the input optical pulse, the Bragg reflection wavelength $\lambda_B$ of the unit FBGs, and the arrangement interval L of the unit FBGs, the output light intensities of the first to 16th optical pulse time spreading units can be made even. In FIG. 4, the chip pulse sequences output from the first to 16th optical pulse time spreading units are respectively denoted as code numbers 1 to 16 on the horizontal axis, and the vertical axis represents the output light intensity as optical spectrum reflectivity. As shown in FIG. 4, it can be seen that the output light intensities of the first to 16th optical pulse time spreading units are substantially even.

<SSFBG>

Figure 5A:
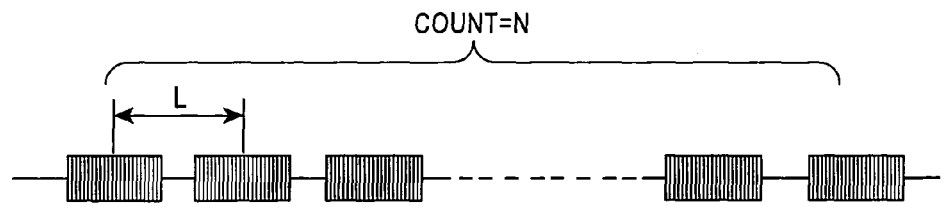
FIGS. 5A and 5B illustrate the structure of an SSFBG constituting each of first to U-th optical pulse time spreading units according to an embodiment of the present invention.
Figure 5B:
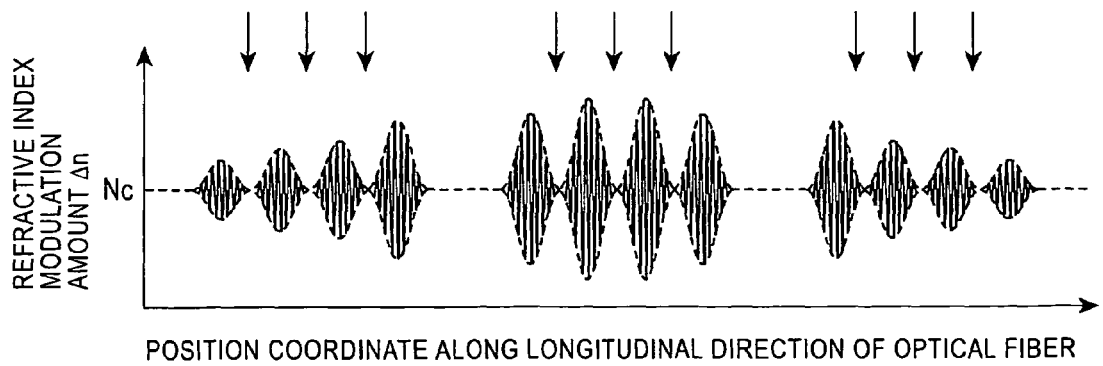

The structure of the SSFBG constituting each of the first to U-th optical pulse time spreading units 28-1 to 28-U will be described with reference to FIGS. 5A and 5B. FIGS. 5A and 5B are illustrating the structure of the SSFBG constituting each of the first to U-th optical pulse time-spreading units 28-1 to 28-U according to an-embodiment of the present invention. FIG. 5A is a diagram showing schematically the way that the unit FBGs are arranged at intervals L in an optical fiber, and FIG. 5B is a diagram showing schematically the refractive index structure of the SSFBG. In FIG. 5B, the position coordinate along the longitudinal direction (i.e., propagation direction) of the optical fiber is plotted on the horizontal axis on an arbitrary scale, and the modulation amount $\Delta n$ of the effective refractive index of the optical fiber is plotted on the vertical axis on an arbitrary scale.

In FIG. 5B, sine wave-like solid-line curves of a fine period indicate periodical refractive index modulation structures forming unit FBGs, and the envelope of sine wave-like curves indicates the way that the refractive index modulation amount is apodized. Further, in FIG. 5B, the downward arrows indicates spaces between adjacent unit FBGs, and a mass (packet) of sine wave-like curves enclosed in an envelope corresponds to one unit FBG.

Each unit FBG is apodized such that the refractive index modulation amount becomes minimal at opposite ends of the unit FBG and maximal at the center. A function to give this apodization (called an apodization function) should be a Gauss error function described later.

It is assumed for convenience of description that the center wavelength of the wavelength spectrum of an input optical pulse is 1549.3 nm and that the full width at half maximum $\Delta\lambda_s$ of this wavelength spectrum is 0.64 nm. The case of 16 channel multiplexing, i.e., where U=16 will be described.

Here, because the value of U is an even number, the values of (2k+1) which satisfy |2k+1|/2<16 are 2k+1=−15, −13, −11, −9, −7, −5, −3, −1, +1, +3, +5, +7, +9, +11, +13, +15. Thus, as to the respective values of the Bragg wavelengths $\lambda_{B1}$ to $\lambda_{B16}$ of the unit FBGs forming the SSFBGs of the first to 16th optical pulse time spreading units, $\lambda_{B1}=\lambda_s+(2k+1)(\Delta\lambda_s/2U)$ =1549.3−15×(0.64/32)=1549.0 (nm), and by adding 0.04 nm to this value a number of times, sequentially $\lambda_{B2}$=1549.04 (nm) to $\lambda_{B16}$=1549.6 (nm) are obtained as the Bragg wavelengths of the unit FBGs forming the SSFBGs of the second to 16th optical pulse time spreading units.

Here, the center wavelength of 1549.3 nm of the wavelength spectrum of the input optical pulse is expressed as $v_s$=193.6 THz in terms of a frequency unit, where the velocity of light is 3.00×10$^8$ m/s. Further, since the center wavelength of the wavelength spectrum of the input optical pulse is 1549.3 nm and the full width at half maximum $\Delta\lambda_s$ of this wavelength spectrum is 0.64 nm, the full width at half maximum $\Delta\lambda_s$ of this wavelength spectrum is expressed as $\Delta v_s$=80 GHz in terms of frequency.

The Bragg frequency $v_{Bp}$ corresponding to the Bragg reflection wavelength $\lambda_{Bp}$ of the unit FBGs included in the p-th optical pulse time spreading unit given by the previously-cited equation (2) is set to be within a range to satisfy that $(193.6×10^{12})−(80×10^9)<v_{Bp}<(193.6×10^{12})+(80×10^9)$. Further, the interval $\Delta v_{Bp}$ between main peaks in the frequency spectrum of the chip pulse sequence output from the p-th optical pulse time spreading unit given by the above-described equation (3) is set to be within a range to satisfy the inequality expressed as $0<\Delta vBp\leqq 80$ GHz.

The arrangement period L of the unit FBGs is set, for example, to satisfy $2n_{eff}\cdot L=(m+(1/2))\lambda_{Bp}$ because the phase difference $\Phi$ between chip pulses reflected from adjacent unit FBGs of the first optical pulse time spreading unit is given by the above-described equation (4): $\Phi=(2m+1)(\lambda_{Bp}/2)$. That is, it is given as $L=(1/2n_{eff})×(2m+1)(\lambda_{Bp}/2)$. Assuming that $n_{eff}$=1.45, the unit FBGs should be arranged such that L=(1/(2×1.45))×(2m+1)×(1/2)×$\lambda_{B1}$=(2m+1)×0.174× 1549.0=267.1×(2m+1) in units of nm. Where $\Delta v_{Bp}=\Delta v_s$=80 GHz, since $\Delta v_{Bp}$ is the chip pulse period, L is given approximately as $L=C/(\Delta v_{Bp}×n_{eff}×2)=3.00×10^8/(80×10^9×1.45×2)$ =1.3×10$^{-3}$ m.

Since the Bragg reflection wavelength $\lambda_{B1}$ of the unit FBGs forming the first optical pulse time spreading unit is 1549.0 nm, the refractive index modulation period $\Lambda$ of the unit FBGs should be set to satisfy that $2n_{eff}\Lambda=\lambda_{B1}$. That is, it should be set as $\Lambda=(1/2n_{eff})\lambda_{B1}$=534 in units of nm. For the Bragg reflection wavelengths of the unit FBGs forming the second to 16th optical pulse time spreading units and the arrangement intervals of the unit FBGs, computation is performed likewise.

Here, the phase difference $\Phi$ between chip pulses reflected from adjacent unit FBGs of the first optical pulse time spreading unit is set to be a half wavelength, when expressed in wavelength phase, or $\pi$ when expressed in angular phase.

As shown in FIG. 5B, the unit FBGs are set such that their magnitudes of the refractive index modulation sequentially increase along the longitudinal direction of the optical fiber, that the magnitude of the refractive index modulation at the center position is maximal, and that the magnitudes of the refractive index modulation decrease as the distance from the center position increases.

Figure 6A:
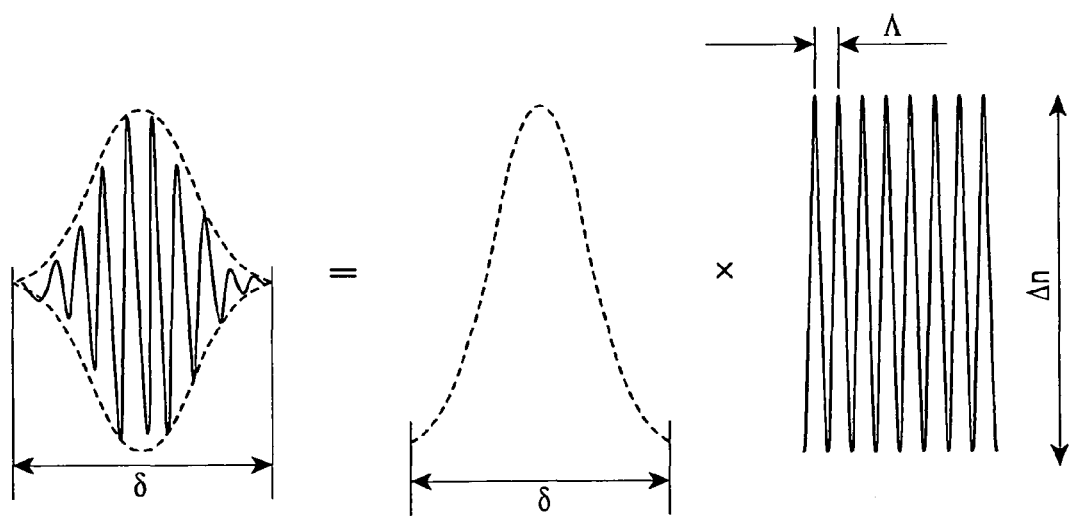
FIGS. 6A and 6B illustrate the apodization of a unit FBG and the way that the magnitudes of the refractive index modulation of the unit FBGs are made to change along the longitudinal direction of the optical fiber.
Figure 6B:
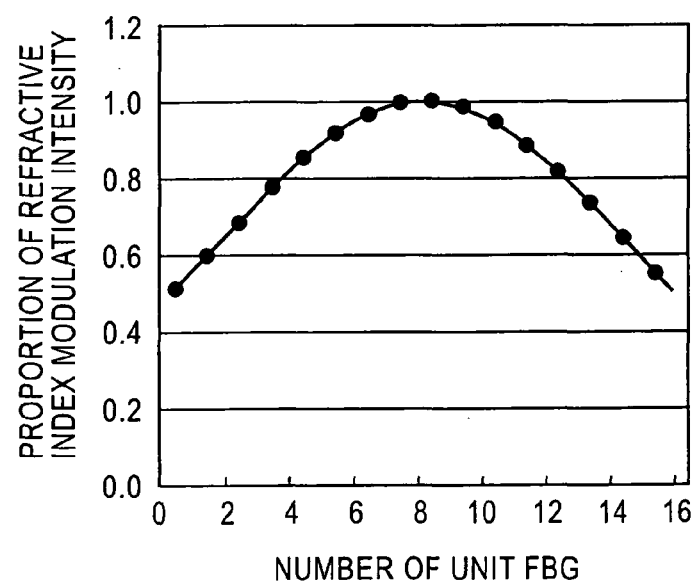

The apodization of a unit FBG and the way that the magnitudes of the refractive index modulation of the unit FBGs are made to change along the longitudinal direction of the optical fiber will be described with reference to FIGS. 6A and 6B. FIGS. 6A and 6B illustrate the apodization of a unit FBG and the way that the magnitudes of the refractive index modulation of the unit FBGs are made to change along the longitudinal direction of the optical fiber. FIG. 6A illustrates the apodization, and FIG. 6B shows the way that the magnitudes of the refractive index modulation change along the longitudinal direction of the optical fiber. The horizontal axis of FIG. 6B shows the numbers of the unit FBGs arranged in the order of first to 32nd from one end to the other end, and the vertical axis represents the proportion of the refractive index modulation intensity for each unit FBG normalized such that the maximum is 1.

As shown in FIG. 6A, for each unit FBG having an effective length $\delta$, the refractive index modulation given by a sine function given by the equation (5) below is apodized according to an apodization function given by the equation (6) below. Here, the apodization function is a Gauss error function, and the x-axis direction is in the longitudinal direction of the optical fiber, and the value of the constant B is set at 0.5.

Further, Λ denotes the refractive index modulation period of the unit FBG denoted as sine wave-like solid-line curves of a fine period in FIG. 5B.

$$\frac{\Delta n}{2}\sin\left(\frac{2\pi}{\Lambda}x\right) \quad (5)$$

$$\exp\left[-\ln2\left\{\frac{2(x-\delta/2)}{B\delta}\right\}^2\right] \quad (6)$$

Further, as shown in FIG. 6B, the unit FBGs are set such that their magnitudes of the refractive index modulation sequentially increase along the longitudinal direction of the optical fiber, that the magnitude of the refractive index modulation at the center position is maximal, and that the magnitudes of the refractive index modulation sequentially decrease as the distance from the center position increases. The proportion of the refractive index modulation intensity of each unit FBG shown in FIG. 6B was determined by a function (called an apodization function) given by the following equation (7). The apodization function given by the equation (7) is a Gauss error function; S is the number of the unit FBG; N is the total number of the unit FBGs; and B is set at 1.3.

$$\exp\left[-\ln2\left\{\frac{2(N-S/2)}{BS}\right\}^2\right] \quad (7)$$

Figure 7A:
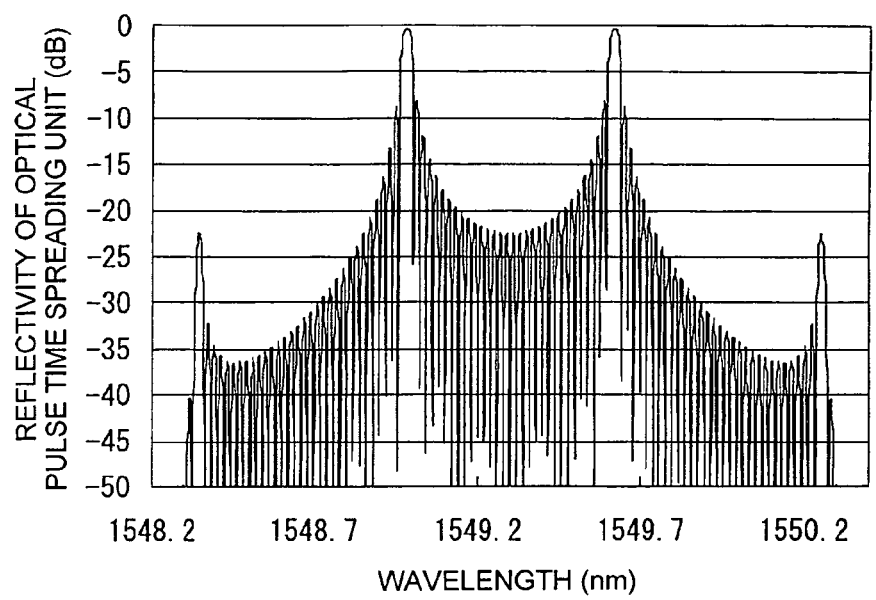
FIGS. 7A and 7B illustrate the effect of the apodization for a unit FBG.
Figure 7B:
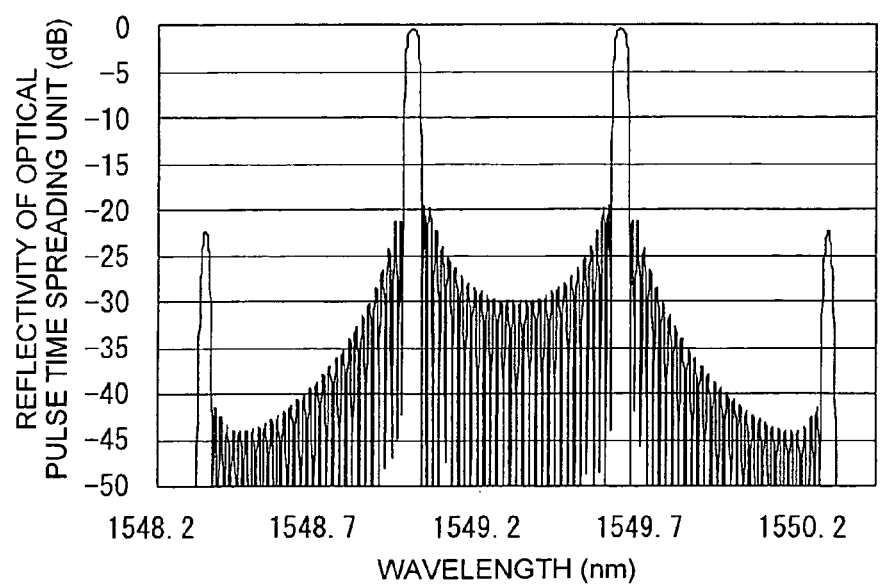

The effect of the apodization for a unit FBG will be described with reference to FIGS. 7A and 7B. FIGS. 7A and 7B illustrate the effect of the apodization; FIG. 7A shows the reflection wavelength spectrum of the optical pulse time spreading unit when apodization for the unit FBG is not performed; and FIG. 7B shows the reflection wavelength spectrum of the optical pulse time spreading unit when apodization for the unit FBG is performed. In FIGS. 7A and 7B, the wavelength is plotted in units of nm on the horizontal axis, and the reflectivity of the optical pulse time spreading unit is plotted in units of dB on the vertical axis.

In both FIGS. 7A and 7B, a total of four conspicuously large peaks are seen i.e., two in the middle and two at both ends. These four large peaks are the main components of the wavelength spectrum of the chip pulse sequence output from the optical pulse time spreading unit. When the quasi-WDM is implemented, the two peak components seen in the middle are the wavelength spectrum components that are allocated to this optical pulse time spreading unit. Thus, as shown in FIG. 7B, by performing apodization, the spectrum components allocated thereto can be definitely separated, which means that the optical pulse time spreading unit operates excellently as an encoder and a decoder.

Figure 8A:
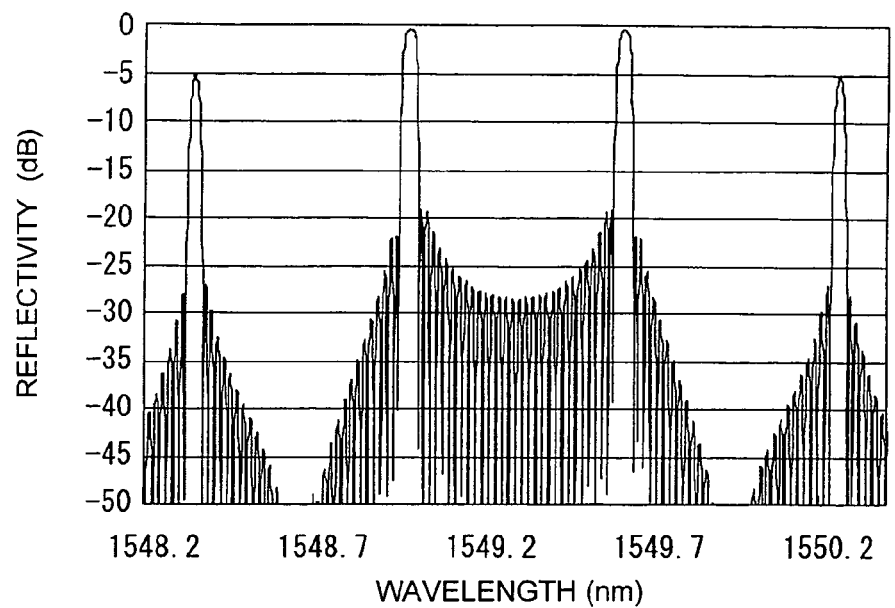
FIGS. 8A and 8B illustrate the effect of the apodization of the refractive index modulation over the entire area from one end to the other end of the SSFBG.
Figure 8B:
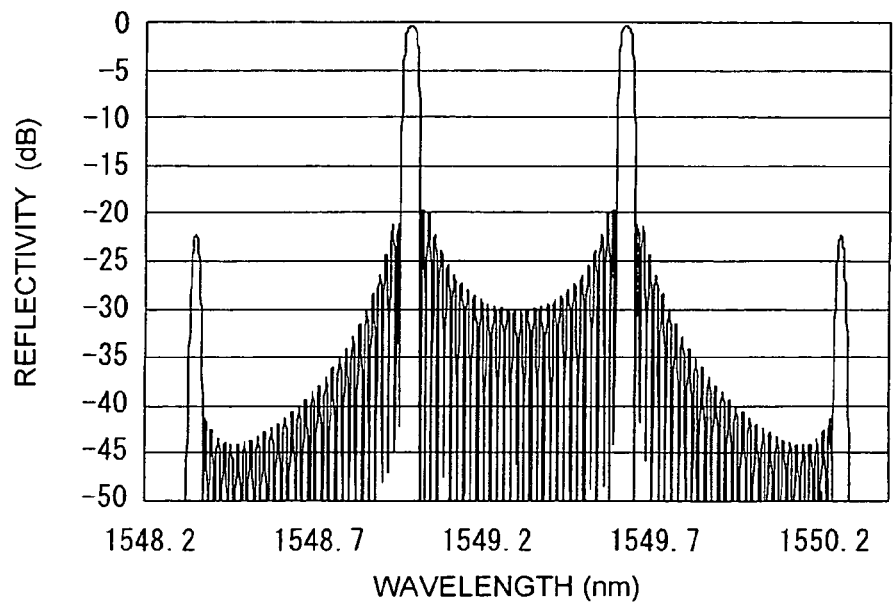

The difference in the wavelength spectrum of the output chip pulse sequence between when the magnitude of the refractive index modulation is set to be the same over the entire area from one end to the other end of the SSFBG constituting the optical pulse time spreading unit and when apodized such that the magnitude of the refractive index modulation is maximal at the center will be described with reference to FIGS. 8A and 8B. FIGS. 8A and 8B illustrate the effect of the apodization of the refractive index modulation over the entire area from one end to the other end of the SSFBG; FIG. 8A shows the reflection wavelength spectrum of the optical pulse time spreading unit when apodization is not performed; and FIG. 8B shows the reflection wavelength spectrum of the optical pulse time spreading unit when apodization is performed. In FIGS. 8A and 8B, the wavelength is plotted in units of nm on the horizontal axis, and the reflectivity of the optical pulse time spreading unit is plotted in units of dB on the vertical axis.

As in the case of the above effect of the apodization for a unit FBG, by performing apodization on the refractive index modulation over the entire SSFBG, the spectrum components allocated thereto can be definitely separated, which means that the optical pulse time spreading unit operates excellently as an encoder and a decoder.

<Encoding and Decoding>

Figure 9A:
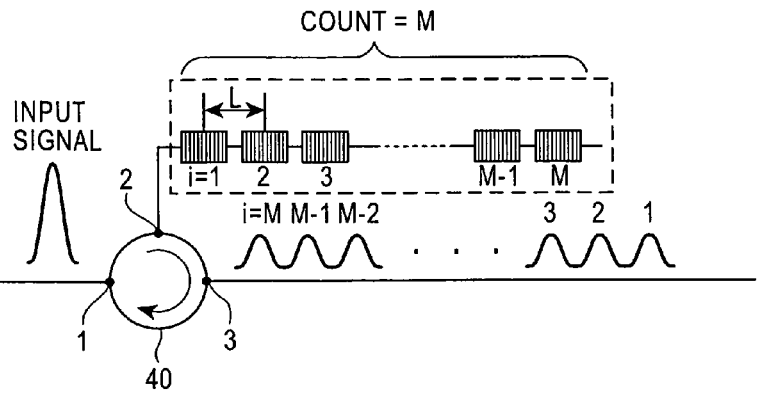
FIGS. 9A-9C illustrate the operation of encoding and decoding by the optical pulse time spreading apparatus according to an embodiment of the present invention.
Figure 9B:
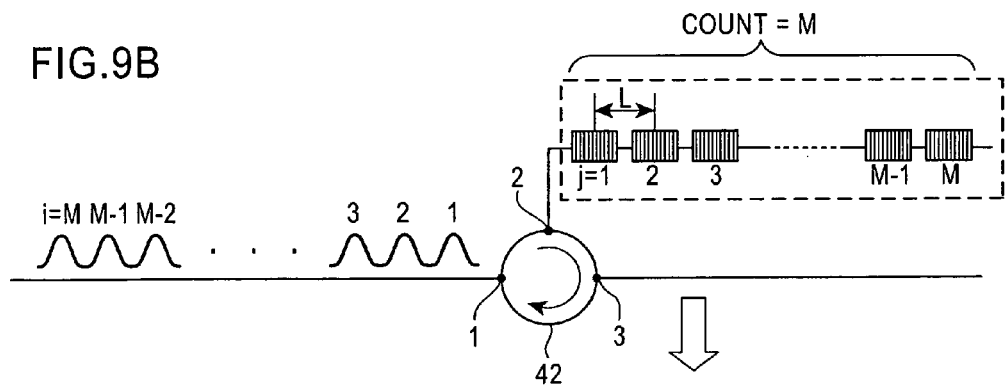
Figure 9C:
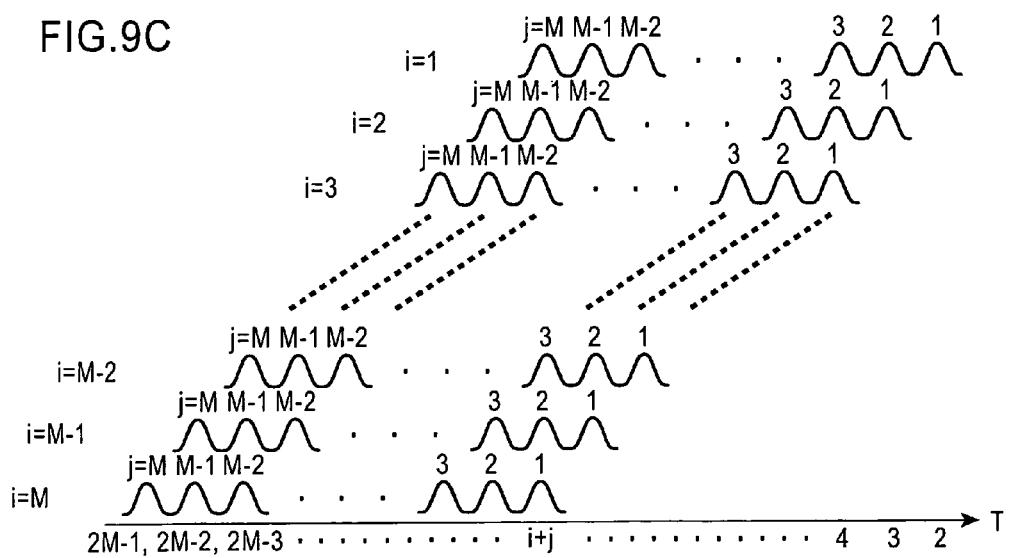

The operation of encoding and decoding by the optical pulse time spreading apparatus according to an embodiment of the present invention will be described with reference to FIGS. 9A to 9C. FIGS. 9A to 9C are diagrams illustrating the operation of encoding and decoding by the optical pulse time spreading apparatus according to an embodiment of the present invention; FIG. 9A shows the way that an optical pulse is transformed and encoded into a chip pulse sequence by any of the optical pulse time spreading units configuring the optical pulse time spreading apparatus according to the embodiment of, the present invention; FIG. 9B shows the way of decoding by any of the optical pulse time spreading units included in an optical pulse time spreading apparatus having the same configuration as the optical pulse time spreading apparatus that encoded; and FIG. 9C is illustrative of the process where each of M chip pulses forming a chip pulse sequence input to the decoder is transformed by the decoder into M chip pulses and where the interference of the total of M×M chip pulses generates an auto-correlation wave or a cross-correlation wave.

In order to explain the operation of encoding and decoding by the optical pulse time spreading apparatus according to the embodiment of the present invention in more general terms, the number of unit FBGs included in the SSFBG forming each of the optical pulse time spreading units that the optical pulse time spreading apparatus comprises is not specified as N, but the number of unit FBGs included in the SSFBG is denoted as M.

In FIG. 9C, the horizontal axis represents time T, and M chip pulse sequences obtained by transforming each of M chip pulses forming a chip pulse sequence input to the decoder into M chip pulses by the decoder are shown in an arrangement where they are arranged in M rows, reflecting a relationship between their delays in being output from the decoder. The chip pulse sequence labeled i=1 is a chip pulse sequence into which the first chip pulse of the chip pulses forming a chip pulse sequence output from the encoder is transformed by the decoder. Likewise, the chip pulse sequences labeled i=2 to 1=M are chip pulse sequences into which the second to M-th chip pulses of the chip pulses forming the chip pulse sequence output from the encoder are respectively transformed by the decoder. The chip pulse sequences labeled i=1 to i=M overlap on the time axis to interfere with each other as shown-in FIG. 9C, and thus an auto-correlation wave or a cross-correlation wave is output from the optical pulse time spreading unit that is a decoder.

In FIGS. 9A to 9C, the SSFBG forming the optical pulse time spreading unit comprises M unit FBGs, and the Bragg reflection wavelength of the unit FBGs is denoted as $\Lambda_B$ and the arrangement interval/period of the unit FBGs is denoted as L.

As shown in FIG. 9A, when an optical pulse is input to a port 1 of an optical circulator 40, the optical pulse is input to the optical pulse time spreading unit (enclosed in a broken-line square in FIG. 9A) via a port 2 of an optical circulator 40. The optical pulse input into the optical pulse time spreading unit is transformed into a chip pulse sequence, and this chip pulse sequence is input to the optical circulator 40 via the port 2 thereof and output from the port 3.

The Bragg reflection wavelength $\lambda_B$ of the unit FBGs and the arrangement interval/period L of the unit FBGs is set such that the phase difference between adjacent chip pulses of the chip pulse sequence output from the optical pulse time spreading unit shown in FIG. 9A is given as $2\pi \times 2 \times L \times n_{eff}/\lambda_B = 2\pi \times (m+(\frac{1}{2}))$, where m is an integer of zero or greater.

Let $\lambda_S$ be the center wavelength of the wavelength spectrum of the input optical pulse. Then, the phase difference $\Phi$ between the chip pulses Bragg-reflected from adjacent unit FBGs is given by the following equation (8):

$$\begin{aligned}\phi &= 2\pi \times 2 \times L \times n_{eff}/\lambda_s \\ &= 2\pi \times (m+(1/2)) \times \lambda_B/\lambda_s \\ &= 2\pi \times (m+(1/2)) \times (1+(\Delta\lambda/\lambda_s)) \\ &= \pi + 2\pi \times (m+(1/2)) \times (\Delta\lambda/\lambda_s)\end{aligned} \quad (8)$$

where $\Delta\lambda = \lambda_B - \lambda_s$. That is, the value of $\Phi$ is determined by the magnitude of $\Delta\lambda$. If $\lambda_B = \lambda_s$, then $\Phi = \pi$.

When an input optical pulse is input to the optical pulse time spreading unit that is an encoder, a chip pulse sequence having an equal number of chip pulses to the number of unit FBGs is generated. In FIGS. 9A and 9B, the number of unit FBGs is denoted as M as mentioned above.

The phase difference having the value given by the above equation (8) between adjacent ones of the chip pulses forming the chip pulse sequence propagates through the optical waveguide and is input to an optical pulse time spreading unit that is a decoder. The process where the above chip pulse sequence is decoded by the decoder will be described with reference to FIG. 9B. Here, description will be made assuming that a chip pulse sequence generated by the i-th optical pulse time spreading unit through encoding is decoded by the j-th optical pulse time spreading unit, where i and j are integers satisfying that $1 \leq i \leq U$ and $1 \leq j \leq U$ respectively.

Assuming that a chip pulse generated through encoding to be imparted with a phase $\Delta\Phi_e$, and output by the i-th optical pulse time spreading unit is decoded to be imparted additionally with a phase $\Delta\Phi_d$ by the j-th optical pulse time spreading unit, then this chip pulse has a phase $\Delta\Phi_{ij}$ given by the following equation (9) with respect to the first chip pulse of the chip pulse sequence:

$$\Delta\Phi_{ij} = i \times \Delta\Phi_e + j \times \Delta\Phi_d \quad (9)$$

As shown in FIG. 9C, each of M chip pulses forming the chip pulse sequence input to a decoder is transformed into M chip pulses by the decoder. As a result, a total of M×M chip pulses are generated. Each of the M chip pulses generated by encoding is transformed further into a chip pulse sequence consisting of M chip pulses, and these chip pulse sequences overlap on the time axis to interfere with each other, thereby generating an auto-correlation wave or a cross-correlation wave.

The phase $\Delta\Phi_{ij}(T)$ of chip pulses overlapping on the time axis at time T=i+j is given by the following equation (10):

$$\Delta\Phi_{ij}(T) = T \times \Delta\Phi_d + (\Delta\Phi_e - \Delta\Phi_d) \times i \quad (10)$$

If the encoder and decoder are optical pulse time spreading units of the same structure, that is, $\Delta\Phi_e = \Delta\Phi_d = \Delta\Phi$, then $\Delta\Phi_{ij}(T) = T \times \Delta\Phi$, and thus all chip pulses interfere in phase with each other at time T, not depending on the value of i. That is, a very large peak is formed at time T, forming an auto-correlation wave.

On the other hand, if the encoder and decoder are optical pulse time spreading units of different structures, that is, $\Delta\Phi_e$ and $\Delta\Phi_d$ are different, then the phase $\Delta\Phi_{ij}(T)$ of chip pulses overlapping on the time axis at time T=i+j differs in value depending on the value of i as obvious from the above equation (10). Hence, chip pulses cancel out each other by interference, forming no peak, and a cross-correlation wave is formed.

The encoding-decoding method of the present invention is implemented by providing two optical pulse time spreading apparatuses of the same structure according to the embodiment of the present invention and using the two as an encoder and a decoder respectively as described above. The optical pulse time spreading apparatuses being of the same structure means that the combination of the configurations of the first to U-th optical pulse time spreading units included in each optical pulse time spreading apparatus is the same, i.e., that the p-th optical pulse time spreading unit of one optical pulse time spreading apparatus is the same in configuration as the p-th optical pulse time spreading unit of the other optical pulse time spreading apparatus, where p refers to all integers satisfying that $1 \leq p \leq U$.

The encoding step is implemented by assigning the first to U-th channels respectively to the first to U-th optical pulse time spreading units included in the optical pulse time spreading apparatus according to the embodiment of the present invention and encoding a transmit signal for each of the channels.

The multiplexing step is implemented by coupling the first to U-th chip pulse sequences respectively output from the first to U-th optical pulse time spreading units by an optical coupler or the like.

The decoding step is implemented by dividing the multiplexed chip pulse sequence of the first to U-th chip pulse sequences into U parts (intensity division) and supplying them respectively to the first to U-th optical pulse time spreading units included in the optical pulse time spreading apparatus according to the embodiment of the present invention which is a decoder. With an optical pulse time spreading unit of the same structure as the optical pulse time spreading unit used when encoded, an auto-correlation wave is produced, and with an optical pulse time spreading unit of a different structure, a cross-correlation wave is produced. Thereby a code division multiplexing scheme is implemented.

Further, because different spectrum bands are respectively assigned to the first to U-th chip pulse sequences as described above, the quasi-WDM is also implemented at the same time in a communication scheme where the optical pulse time spreading apparatus of the present invention is used as the encoder and the decoder.

<Add-Drop-Multiplexer>

Figure 10A:
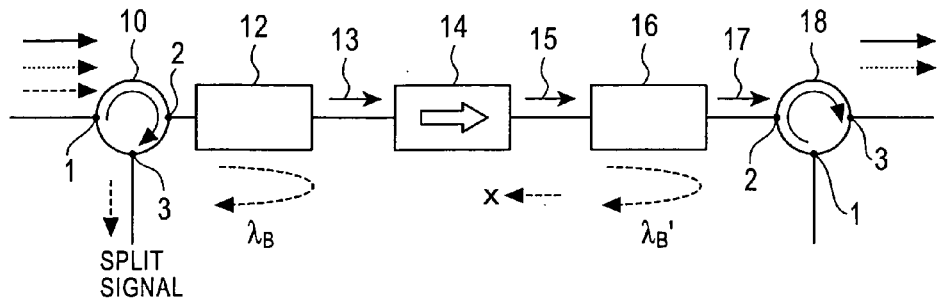
FIGS. 10A and 10B illustrate the configuration and operation of an ADM according to an embodiment of the present invention.
Figure 10B:
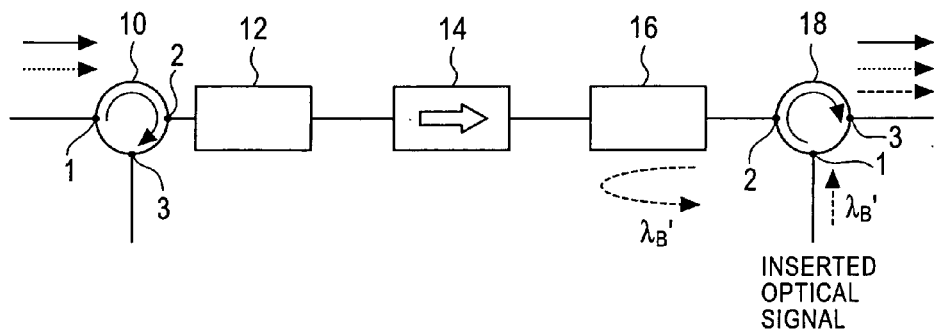

The configuration and operation of the add-drop-multiplexer (ADM) according to an embodiment of the present invention will be described with reference to FIGS. 10A and 10B. FIGS. 10A and 10B are diagrams illustrating the configuration and operation of the ADM according to the embodiment of the present invention; FIG. 10A shows the splitting of a signal; and FIG. 10B shows the insertion of a signal.

The ADM according to the embodiment of the present invention comprises a first optical circulator 10, a first optical pulse time spreading apparatus 12, an optical isolator 14, a second optical pulse time spreading apparatus 16, and a second optical circulator 18. The SSFBG of the first optical pulse time spreading apparatus 12 is formed in such a way as to decode a chip pulse sequence whose Bragg reflection wavelength is $\lambda_B$, and the SSFBG of the first optical pulse time spreading apparatus 16 is formed in such a way as to decode a chip pulse sequence whose Bragg reflection wavelength is $\lambda_B'$.

As shown in FIG. 10A, the first optical circulator 10 comprises first to third ports, and the second optical circulator 18 also comprises first to third ports. An optical signal output from the second port of the first optical circulator 10 is input to the first optical pulse time spreading apparatus 12; an optical signal 13 output from the first optical pulse time spreading apparatus 12 is input to the optical isolator 14; an optical signal 15 output from the optical isolator 14 is input to the second optical pulse time spreading apparatus 16; an optical signal 17 output from the second optical pulse time spreading apparatus 16 is input to the second port of the second optical circulator 18; and an optical signal is output from the third port of the second optical circulator 18 to the outside.

The signal component having a Bragg reflection wavelength of $\lambda_B$ assigned thereto of the input optical signal input to the first optical circulator 10 is Bragg-reflected to be decoded in the first optical pulse time spreading apparatus 12 and is output as a split signal from the third port of the first optical circulator 10 via the first optical circulator 10. Meanwhile, the signal component having a Bragg reflection wavelength of $\lambda_B'$ assigned thereto passes through the first optical pulse time spreading apparatus 12 and the optical isolator 14 and is Bragg-reflected in the second optical pulse time spreading apparatus 16. However, the signal component Bragg-reflected in the second optical pulse time spreading apparatus 16 is blocked by the optical isolator 14 so as not to return to the first optical circulator 10.

Meanwhile, as shown in FIG. 10B, when a subscriber network comprising the ADM according to the embodiment of the present invention performs transmission to the outside, an insertion optical signal (i.e., a to-be-inserted optical signal) that is inserted into the ADM according to the embodiment of the present invention is input via the first port of the second optical circulator 18 and is output from the second port to be input to the second optical pulse time spreading apparatus 16, where the signal is encoded into a chip pulse sequence whose Bragg reflection wavelength is $\lambda_B'$. An encoded signal that is the chip pulse sequence whose Bragg reflection wavelength is $\lambda_B'$ is transmitted to the outside via the second and third ports of the second optical circulator 18.

As described above, an input optical signal supplied from outside the ADM according to the embodiment of the present invention is input via the first port of the first optical circulator 12, and a split signal split and extracted by this ADM is output from the third port of the first optical circulator 10 and taken into the subscriber network. Meanwhile, an insertion optical signal that is output from this subscriber network via the ADM to the outside is input to the first port of the second optical circulator 18 and output from the third port.

<Optical Communication System>

Figure 11:
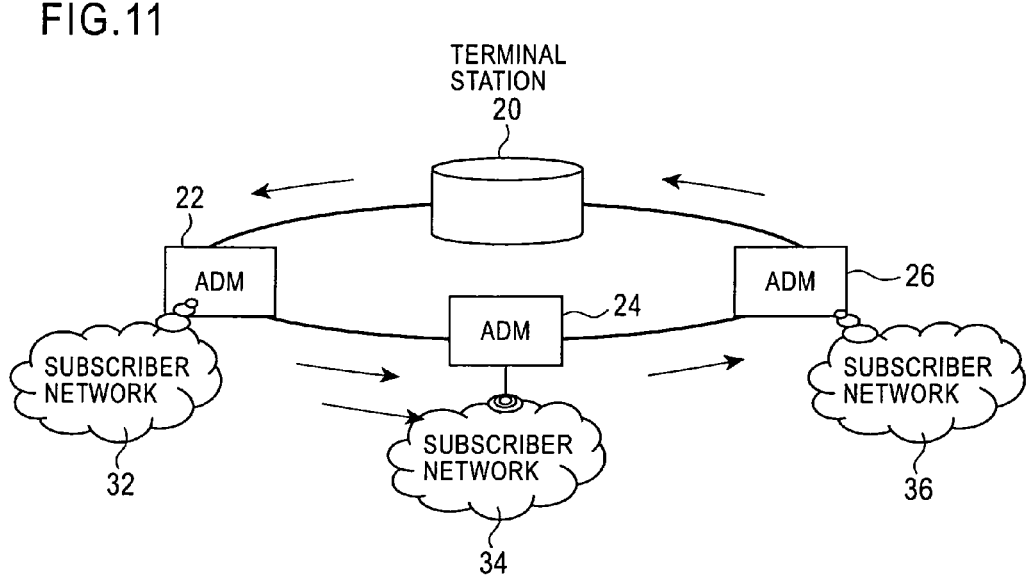
FIG. 11 is a schematic block configuration diagram of an optical communication system according to an embodiment configured with subscriber networks connected in a loop to a local switch via an optical fiber transmission line with use of ADMs of the embodiment.

An optical communication system configured with the ADM according to the embodiment of the present invention will be described with reference to FIG. 11. FIG. 11 is a schematic block configuration diagram of the optical communication system according to an embodiment configured with subscriber networks connected in a loop to a terminal station 20 via an optical fiber transmission line with use of ADMs of the embodiment.

The optical communication system according to the embodiment of the present invention comprises a plurality of subscriber networks 32, 34, 36, and specific ADMs 22, 24, are assigned to the subscriber networks 32, 34, 36 respectively. The subscriber networks are connected to an optical fiber network forming part of the optical communication system via the ADMs 22, 24, 26 respectively. As the ADMs 22, 24, 26, the above ADM according to the embodiment of the present invention is used.

Here, for convenience of description, it is assumed that first to third channels are assigned to each of the plurality of subscriber networks 32, 34, 36, each of which communicates using first to third chip pulse sequences.

A code that is a rule to generate the first to third chip pulse sequences from an input optical pulse and restore the input optical pulse from the first to third chip pulse sequences is assigned to the first and second optical pulse time spreading apparatuses of each of the ADMs 22, 24, 26. Then, in each of the first and second optical pulse time spreading apparatus configuring each of the ADMs 22, 24, 26, only the optical pulse time spreading unit having the assigned code set therein from among the first to third optical pulse time spreading units is set to be operable.

It is assumed that the Bragg reflection wavelength of the unit FBGs that is set in the SSFBGs of the optical pulse time spreading units configuring the first optical pulse time spreading apparatus of the ADMs 22, 24, 26 assigned to the subscriber networks 32, 34, 36 is set to be $\lambda_1$ to $\lambda_3$ respectively, and also the Bragg reflection wavelength of the unit FBGs that is set in the SSFBGs of the optical pulse time spreading units forming part of the second optical pulse time spreading apparatus is set to be $\lambda_1'$ to $\lambda_3'$ for the ADMs 22, 24, 26 respectively.

For the optical communication system having this configuration, the specific operations of the ADMs respectively assigned to the subscriber networks 32, 34, 36 can be understood by reading the above description of the ADM according to the embodiment of the present invention with replacing the Bragg reflection wavelength $\lambda_B$ in the description by each of $\lambda_1$ to $\lambda_3$ and replacing the Bragg reflection wavelength $\lambda_B'$ by each of $\lambda_1'$ to $\lambda_3'$.

For example, an input optical signal supplied from outside the ADM 22 (see FIG. 10A) included in the subscriber network 32 is input via the first port of the first optical circulator 10, and a split signal (whose Bragg reflection wavelength is $\lambda_1$) split and extracted by this ADM 22 is output from the third port of the first optical circulator 10 and taken in by the subscriber network 32. Meanwhile, an insertion optical signal (whose Bragg reflection wavelength is $\lambda_1'$) that is output from the subscriber network 32 via the ADM 22 (see FIG. 10B) to the outside is input to the first port of the second optical circulator 18 and output from the third port.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2009-045703 which is hereby incorporated by reference.

What is claimed is:

1. An optical pulse time spreading apparatus which comprises first to U-th optical pulse time spreading units each outputting a chip pulse sequence having N chip pulses from a first to an N-th chip pulse arranged in order on a time axis by time-spreading an input optical pulse, where N is an integer of two or greater and U is an integer of one or greater satisfying that $U \leq N$, wherein each of said first to U-th optical pulse time spreading units comprises a superstructured fiber Bragg grating (SSFBG) comprising N unit fiber Bragg gratings (FBGs);

an interval between adjacent ones of said unit FBGs arranged in a p-th optical pulse time spreading unit, where p refers to all integers of from 1 to U, and a Bragg reflection wavelength of said unit FBGs in the p-th optical pulse time spreading unit are set such that spectra of first to U-th chip pulse sequences respectively output from said first to U-th optical pulse time spreading units are different from each other; and the Bragg reflection wavelength $\lambda_{Bp}$ of the unit FBGs included in said p-th optical pulse time spreading unit is given by the following equations (1a) and (1b):

$$\lambda_{Bp} = \lambda_s + k(\Delta\lambda_s/U) \quad (1a)$$

for when U is an odd number, where k is an integer satisfying that $|k| < U/2$, $$\lambda_{Bp} = \lambda_s + (2k+1)(\Delta\lambda_s/2U) \quad (1b)$$

for when U is an even number, where k is an integer satisfying that $|2k+1|/2 < U/2$, wherein a Bragg frequency $v_{Bp}$ corresponding to the Bragg reflection wavelength $\lambda_{Bp}$ of the unit FBGs included in said p-th optical pulse time spreading unit is set to be within a range to satisfy an inequality given by the following equation (2):

$$(v_s - \Delta v_s/2) < v_{Bp} < (v_s + \Delta v_s/2) \quad (2)$$

wherein an interval $\Delta v_{Bp}$ between main peaks in the frequency spectrum of the chip pulse sequence output from said p-th optical pulse time spreading unit is set to be within a range to satisfy an inequality given by the following equation (3):

$$0 < \Delta v_{Bp} < \Delta v_s \quad (3)$$

and wherein the interval between adjacent ones of the unit FBGs arranged in said p-th optical pulse time spreading unit and the Bragg reflection wavelength of the unit FBGs in the p-th optical pulse time spreading unit are set such that a phase difference $\Phi$ between chip pulses reflected from adjacent unit FBGs of said p-th optical pulse time spreading unit is given by the following equation (4):

$$\Phi = (2m+1)(\lambda_{Bp}/2) \quad (4)$$

where $\lambda_s$ is a peak wavelength of the wavelength spectrum of said input optical pulse, $\Delta\lambda_s$ is the full width at half maximum of the wavelength spectrum of said input optical pulse, $v_s$ is a peak frequency of the frequency spectrum of said input optical pulse, $\Delta v_s$ is the full width at half maximum of the frequency spectrum of said input optical pulse, and m is an integer of zero or greater.

2. An optical pulse time spreading apparatus according to claim 1, wherein the Bragg reflection wavelength $\lambda_{Bp}$ of the unit FBGs included in said p-th optical pulse time spreading unit is given by the following equations (1a) and (1b):

$$\lambda_{Bp} = \lambda_s + k(\Delta\lambda_s/U) \quad (1a)$$

for when U is an odd number, where k is an integer satisfying that $|k| < U/2$, $$\lambda_{Bp} = \lambda_s + (2k+1)(\Delta\lambda_s/2U) \quad (1b)$$

for when U is an even number, where k is an integer satisfying that $|2k+1|/2 < U/2$, wherein a Bragg frequency $v_{Bp}$ corresponding to the Bragg reflection wavelength $\lambda_{Bp}$ of the unit FBGs included in said p-th optical pulse time spreading unit is set to be within a range to satisfy an inequality given by the following equation (2):

$$(v_s - \Delta v_s/2) < v_{Bp} < (v_s + \Delta v_s/2) \quad (2)$$

wherein an interval $\Delta v_{Bp}$ between main peaks in the frequency spectrum of the chip pulse sequence output from said p-th optical pulse time spreading unit is set to be within a range to satisfy an inequality given by the following (3):

$$0 < \Delta v_{Bp} < \Delta v_s \quad (3)$$

and wherein the interval between adjacent ones of the unit FBGs arranged in said p-th optical pulse time spreading unit and the Bragg reflection wavelength of the unit FBGs in the p-th optical pulse time spreading unit are set such that a phase difference $\Phi$ between chip pulses reflected from adjacent unit FBGs of said p-th optical pulse time spreading unit is given by the following equation (4):

$$\Phi = (2m+1)(\lambda_{Bp}/2) \quad (4)$$

and such that spectra of first to U-th chip pulse sequences respectively output from said first to U-th optical pulse time spreading units are different from each other and that energies of the chip pulse sequences are even, where $\lambda_s$ is a peak wavelength of the wavelength spectrum of said input optical pulse, $\Delta\lambda_s$ is the full width at half maximum of the wavelength spectrum of said input optical pulse, $v_s$ is a peak frequency of the frequency spectrum of said input optical pulse, $\Delta v_s$ is the full width at half maximum of the frequency spectrum of said input optical pulse, and m is an integer of zero or greater.

3. An optical pulse time spreading apparatus according to claim 1, wherein each of said N unit FBGs is apodized such that a refractive index modulation amount becomes minimal at opposite ends of the unit FBG and maximal at the center.

4. An optical pulse time spreading apparatus according to claim 1, wherein the unit FBGs included in said SSFBG are set such that magnitudes of refractive index modulation sequentially increase along the longitudinal direction of an optical fiber, that the magnitude of the refractive index modulation at the center position is maximal, and that magnitudes of the refractive index modulation sequentially decrease along the longitudinal direction of the optical fiber as the distance from the center position increases.

5. An add-drop-multiplexer which comprises a first optical circulator having first to third ports, a second optical circulator having first to third ports, a first optical pulse time spreading apparatus, a second optical pulse time spreading apparatus, and an optical isolator, wherein the add-drop-multiplexer is configured such that:
an optical signal output from the second port of said first optical circulator is input to said first optical pulse time spreading apparatus;
an optical signal output from said first optical pulse time spreading apparatus is input to said optical isolator;
an optical signal output from said optical isolator is input to said second optical pulse time spreading apparatus;
an optical signal output from said second optical pulse time spreading apparatus is input to the second port of said second optical circulator;
an input optical signal supplied from outside the add-drop-multiplexer is input via the first port of said first optical circulator;

a split signal split and extracted by the add-drop-multiplexer is output from the third port of said first optical circulator;

an insertion optical signal that is output outside the add-drop-multiplexer via the add-drop-multiplexer is input to the first port of said second optical circulator; and an output optical signal that is output from the add-drop-multiplexer to the outside is output from the third port of said second optical circulator, and wherein said first and second optical pulse time spreading apparatuses are each an optical pulse time spreading apparatus that includes:

first to U-th optical pulse time spreading units each outputting a chip pulse sequence having N chip pulses from a first to an N-th chip pulse arranged in order on a time axis by time-spreading an input optical pulse, where N is an integer of two or greater and U is an integer of one or greater satisfying that $U \leq N$, wherein each of said first to U-th optical pulse time spreading units comprises a superstructured fiber Bragg grating (SSFBG) comprising N unit fiber Bragg gratings (FBGs), and wherein an interval between adjacent ones of said unit FBGs arranged in a p-th optical pulse time spreading unit, where p refers to all integers of from 1 to U, and a Bragg reflection wavelength of said unit FBGs in the p-th optical pulse time spreading unit are set such that spectra of first to U-th chip pulse sequences respectively output from said first to U-th optical pulse time spreading units are different from each other.

6. An optical communication system which includes a plurality of subscriber networks, wherein each of said subscriber networks is assigned a specific add-drop-multiplexer and is connected via the add-drop-multiplexer to an optical fiber network forming part of the optical communication system, and said add-drop-multiplexer is an add-drop-multiplexer according to claim 5.

7. An optical communication system according to claim 6, wherein a code that is a rule to generate the sequence of said first to N-th chip pulses from said input optical pulse and restore said input optical pulse from the sequence of the first to N-th chip pulses is assigned to said first and second optical pulse time spreading apparatuses of said specific add-drop-multiplexer, and wherein in each of said first and second optical pulse time spreading apparatuses forming part of said specific add-drop-multiplexer, only an optical pulse time spreading unit having said assigned code set therein from among said first to U-th optical pulse time spreading units is set to be operable.

* * * * *